R. O. WOOD.
DEVICE FOR TESTING THE TEARING STRENGTH OF PAPER.
APPLICATION FILED MAY 5, 1917.
1,273,972.
Patented July 30, 1918.
2 SHEETS—SHEET 1.
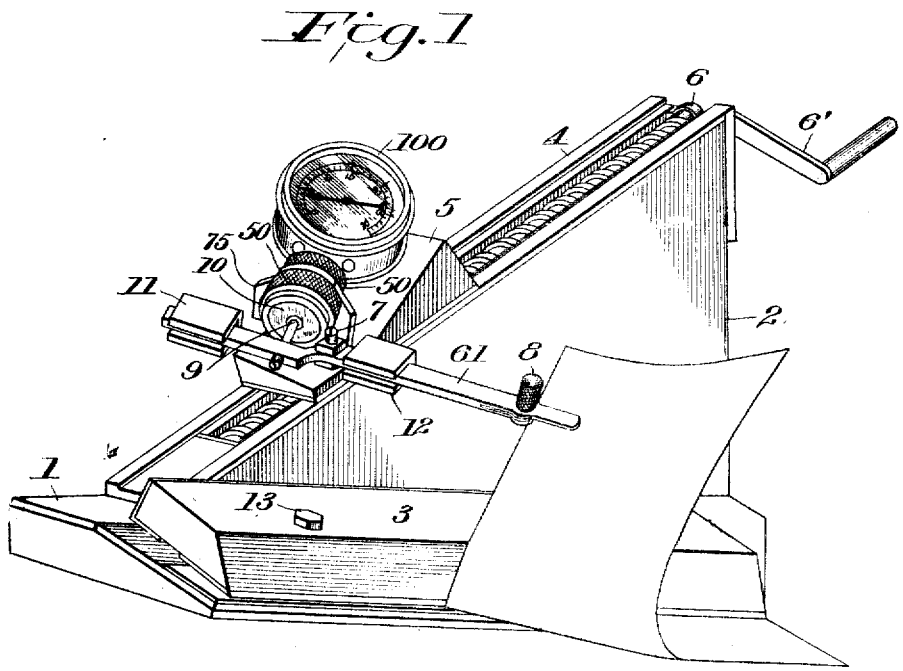
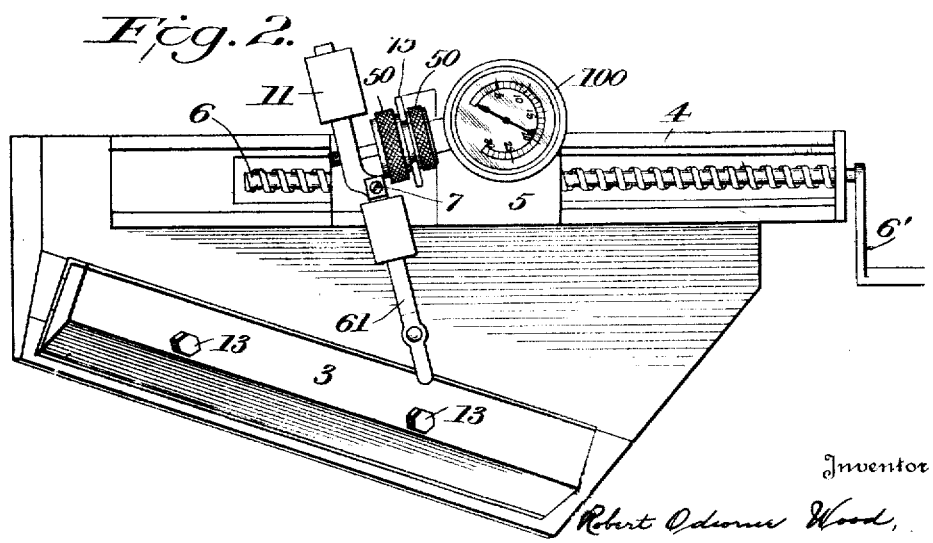
Inventor:
Robert Odiorne Wood,
By Byrnes Townsend & Brickenstein
Attorneys R. O. WOOD.
DEVICE FOR TESTING THE TEARING STRENGTH OF PAPER.
APPLICATION FILED MAY 5, 1917.
1,273,972.
Patented July 30, 1918.
2 SHEETS—SHEET 2.
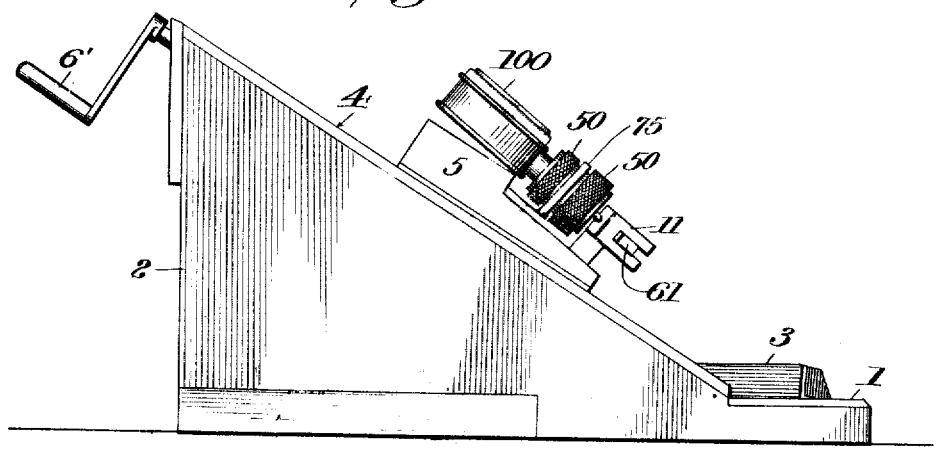
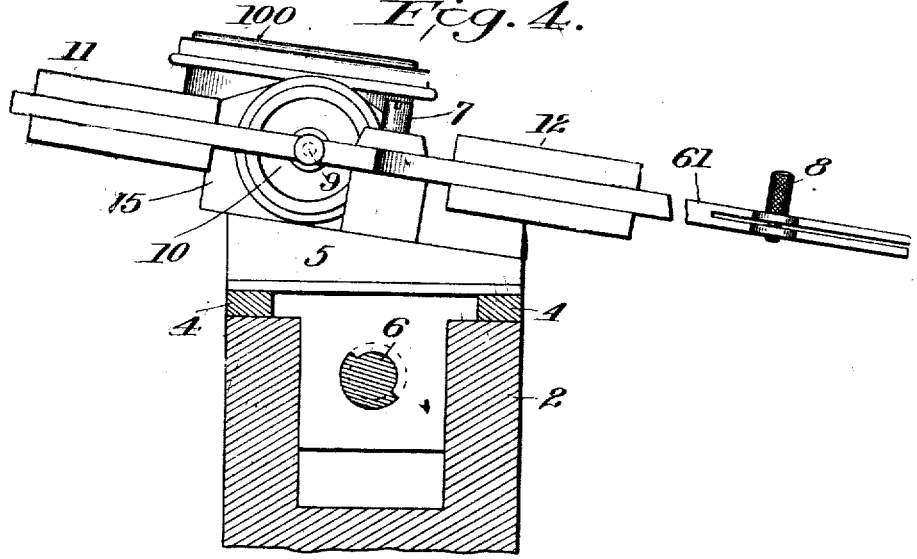
Inventor
Robert Odiorne Wood,
By Byrne, Townsend & Brickenstein
Attorneys

UNITED STATES PATENT OFFICE.

ROBERT ODIORNE WOOD, OF BROOKLINE, MASSACHUSETTS, ASSIGNOR TO ARTHUR D. LITTLE, INCORPORATED, OF BOSTON, MASSACHUSETTS, A CORPORATION OF MASSACHUSETTS.

DEVICE FOR TESTING THE TEARING STRENGTH OF PAPER.

1,273,972.

Specification of Letters Patent.

Patented July 30, 1918.

Application filed May 5, 1917. Serial No. 166,512.

*To all whom it may concern:*

Be it known that I, ROBERT O. WOOD, a citizen of the United States, residing at Brookline, in the county of Norfolk and State of Massachusetts, have invented certain new and useful Improvements in Devices for Testing the Tearing Strength of Paper, of which the following is a specification.

My invention relates to devices for testing the tearing strength of paper and the instrument embodying my invention is especially designed for the purpose of determining the relative tearing strength of different classes of paper. However, as will be appreciated upon an understanding of the invention, the device is equally applicable for testing or measuring the tearing strength of other fibrous materials, subject perhaps to obvious changes or modifications.

The device of my present invention comprises, briefly, an incline, a mechanism traveling on the incline and adapted to clasp a portion of the paper to be tested, a straight edge set at an angle with respect to the incline and means for tightly clamping the paper under it along one edge.

For a fuller understanding of my invention reference is had to the accompanying drawings, in which—

Figure 1 is a perspective view of my device in operative position;

Fig. 2 a plan view;

Fig. 3 a side elevation; and

Fig. 4 an end view, partly in section to show the operating mechanism.

The operating elements are assembled on a base 1 of suitable length and width and comprise a wedge shaped structure 2, a straight edge 3 and the testing device proper. The wedge 2 presents a surface 4 inclined at a suitable angle to the base. On this surface is mounted a sliding carriage 5, adapted to be reciprocated by a spiral screw 6, having a handle 6'. It is understood that the spiral screw is merely a convenient illustration of many mechanical motion-translating contrivances applicable for imparting motion to the carriage 5.

On the carriage 5 is pivoted a lever 61 on a suitable fulcrum indicated as a pin 7. This lever carries at an end a clamping device, the particular character of which is immaterial, so long as it serves the purpose of securely clasping and clamping the paper to be tested. As an illustration I have shown the lever 61 bifurcated and provided with a clamp screw 8.

On the side of the lever opposite the clamping device and a relatively short distance from the fulcrum I have attached a mushroom shaped pin 9 which bears upon a rubber diaphragm 10. The rubber diaphragm is merely referred to as a conventional yielding means for similar purposes and is intended to represent all available means for responding to varying forces.

Behind the diaphragm is confined a liquid, such as glycerin or any suitable fluid, in chamber 50, which in turn communicates through a very fine passage with an ordinary pressure gage 100. The object of the fine passage is to damp the vibrations of the needle of the pressure gage. The chambers and pressure gage are supported upon the carriage 5 by a saddle plate 75.

At the extreme end of the lever opposite clamp 8 there is an adjustable counterweight 11 designed to balance the arm or lever 61. Another small adjustable weight is supported on the arm 61 on the opposite side of the fulcrum, which together with the weight first named, supplies sufficient inertia to even out vibrations produced by inequalities in the paper.

The base 1 is made slightly tapering along one edge to receive the straight-edge 3 in a position slightly inclined with respect to the horizontal to insure a clean and uniform tearing of the paper. The member 3 has an edge arranged at angle with respect to the incline 4, against which the paper is torn. The straight edge 3 is so constructed that the paper is tightly clamped under it along its edge. The clamping action may be exerted by any suitable means, as for instance by screws 13. The bar 3 is placed at an angle to the plane of part 2 for the purpose of keeping the angle of pull on the paper constant.

The operation is briefly as follows: A sheet of paper is clamped under the tearing edge, with a portion projecting outside. The carriage is brought to its lowest point and the edge of the paper is inserted in and secured by the clamp. When the handle turning the screw is rotated, the carriage travels up the incline and thus puts a tension on the paper through the lever. The tension required to tear the sheet of paper is transmitted to the rubber diaphragm, by means of the lever and the mushroom-shaped pin and thence to the pressure gage.

By proper calibration the gage dial may be made to indicate the exact tension in ounces, or it may be calibrated in terms of classification to indicate relative tearing strength.

If more than one sheet of paper is torn at one time, the readings on the gage are multiplied accordingly and a particular advantage is gained in that an average tearing strength may be at once determined by simply dividing the reading by the number of sheets torn.

It is understood that a recording gage may be substituted for a purely indicating gage to give a graphic representation of the tearing strength.

I am aware that numerous changes and modifications may be made within the scope of my invention and therefore, what has been shown, is for purposes of illustration only.

I claim:—

1. The combination with means defining an edge of means for holding a sheet of fibrous material along said edge, means for tearing the material against the edge and means for indicating the force necessary to tear the material.

2. The combination with means defining an edge of means for holding a sheet of fibrous material along said edge, means for tearing the material against the edge and means connected with the tearing-means for indicating the force necessary to tear the material.

3. The combination with means defining an edge of means for holding a sheet of fibrous material along said edge, means for tearing the material against the edge, said tearing-means yielding under the force necessary to tear the material and means for indicating the degree of yielding.

4. The combination with means defining an edge of means for holding a sheet of fibrous material along said edge, means for tearing the material against the edge, means connected with the tearing-means yielding under the force necessary for tearing and an indicator associated with the yielding-means for indicating the degree of yielding.

5. The combination with means defining an edge of means for holding a sheet of fibrous material along said edge, means for tearing the material against the edge, said tearing-means comprising a yielding lever and means for indicating the degree of yielding of the lever under the force necessary to tear the material.

6. The combination with means defining an edge of means for holding a sheet of fibrous material along said edge, means for tearing the material against the edge, said tearing-means comprising a yielding lever having clamping connection with the material and means for indicating the degree of yielding of the lever under the force necessary to tear the material.

7. The combination with means defining an edge of means for holding a sheet of fibrous material along said edge, an arm positioned adjacent said means and adapted to grip the material, means for moving the arm in the general direction of the edge and means for indicating the force required to move the arm to tear the material against the edge.

8. The combination with means defining an edge of means for holding a sheet of fibrous material along said edge, an arm positioned adjacent said means and adapted to grip the material, means for moving the arm in the general direction of the edge to tear the material thereagainst and means associated with the lever responsive to the force required to tear the material and means for indicating the degree of response when the material is torn against the edge.

9. The combination with means defining an edge of means for holding a sheet of fibrous material along said edge, an arm positioned adjacent said means, means on said arm for gripping the material, means for moving the arm in the general direction of the edge, yielding-means associated with the lever adapted to yield under the force required to tear the material against the edge and means for indicating the amount of yielding when the material is torn.

10. The combination with means defining an edge of means for holding a sheet of fibrous material along said edge, an arm positioned adjacent said means, means on said arm for gripping the material, means for moving said arm at an angle to the edge and means for indicating the force necessary to tear the material against the edge.

11. The combination with means defining an edge of means for holding the sheet of fibrous material along said edge, an arm positioned adjacent said edge, means on said arm for gripping the material, means for moving the arm in such a direction as to tear the material against the edge at a uniform rate of speed, when the arm is moved at a uniform rate of speed.

12. The combination with means defining an edge of means for holding a sheet of fibrous material along said edge, an arm positioned adjacent said edge, means on said arm for gripping the material, means for moving the arm in such a direction as to tear the material against the edge at a uniform rate of speed when the arm is moved at a uniform rate of speed and means for indicating the force necessary to tear the material.

13. The combination with means defining an edge of means for holding a sheet of fibrous material along said edge, means for gripping the material and means for moving the gripping means in such a direction as to tear the material against the edge at a uniform rate of speed when the gripping means is moved at a uniform rate of speed.

14. The combination with means defining an edge of means for holding a sheet of fibrous material along said edge, means for gripping the material, means for moving the gripping means in such a direction as to tear the material against the edge at a uniform rate of speed when the gripping means is moved at a uniform rate of speed and means for indicating the force required to tear the material.

15. The combination with means defining an edge of means for holding a sheet of fibrous material along said edge, means for gripping the material, means for moving the gripping means at an angle to the edge and to the base-plane thereof and means for indicating the force required to tear the material against the edge.

16. The combination with means defining an edge of means for holding a sheet of fibrous material along said edge, means for gripping the material, means for moving the gripping means at an angle to the base-plane thereof and means for indicating the force required to tear the material against the edge.

17. The combination with means defining an edge of means for holding a sheet of fibrous material along said edge, means for gripping said sheet, means for moving the gripping means so as to tear the sheet against the edge and means for indicating the force necessary to tear the sheet.

18. The combination of a straight-edge, means coöperating therewith to hold a sheet of fibrous material along an edge of the straight edge, means for gripping the sheet and means for moving the gripping means at an angle to both the edge and the base-plane of the straight-edge to tear the paper and means for indicating the force required to tear the paper against the edge.

19. The combination with means defining an edge of means for holding a sheet of fibrous material along said edge, means for tearing the sheet against the edge, a pressure gage connected with the tearing-means adapted to indicate the force required to tear the sheet.

20. The combination of a straight-edge, means coöperating therewith to hold a sheet of fibrous material along its edge, means for defining an inclined plane, at an angle to the base-plane of the straight-edge, a lever adapted to be moved up the inclined plane, means on this lever for gripping the sheet and a pressure gage connected with the lever to indicate the force required to move the lever in tearing the sheet against the edge.

21. The combination of a body presenting a sharp edge, means for holding a sheet of fibrous material along the edge, means for gripping the sheet, means for moving the gripping means away from the edge in such a direction as to tear the sheet at a uniform rate of speed when the gripping means is moved at a uniform rate of speed and means for indicating the force required to tear the paper against the edge.

22. The combination of a body presenting a sharp edge, means for holding a sheet of fibrous material along the edge, a support adjacent the edge having a surface inclined with respect to the edge, a carriage adapted to move on said surface, means for moving the carriage upon said surface, a lever fulcrumed upon the carriage, means on the lever at one side of the fulcrum adapted to grip the sheet, a yielding element on the carriage connected to the lever at the other side of the fulcrum and means for indicating the degree of yielding when the lever is moved to tear the sheet against the edge.

23. The combination of a body presenting a sharp edge, means for holding a sheet of fibrous material along the edge, a support adjacent the edge having a surface inclined with respect to the edge and so disposed that the edge forms an angle with the general longitudinal direction of the surface, a carriage adapted to be moved upon the surface, means for moving the carriage, a lever fulcrumed upon the carriage, means on the lever at one side of the fulcrum to grip the sheet, a counterweight upon the lever upon the other side of the fulcrum, a yielding means connected to the lever and means for indicating the degree of yielding when the lever is moved to tear the paper against the edge.

24. The combination of a body presenting a sharp edge, means for holding a sheet of fibrous material along the edge, a support adjacent the edge having a surface inclined with respect to the edge and so disposed that the edge forms an angle with the general longitudinal direction of the surface, a carriage adapted to be moved upon the surface, means for moving the carriage, a lever fulcrumed upon the carriage, means on the lever at one side of the fulcrum to grip the sheet, adjustable weights on opposite sides of the fulcrum and a pressure gage connected with the lever to indicate the force required to move the carriage for tearing the sheet against the edge.

25. The combination of means for holding a sheet of fibrous material along an edge, means for gripping the sheet, means for moving the gripping means to tear the sheet against the edge and means for indicating the force required to tear the sheet, said means comprising an arm connected to the gripping means, a mushroom head on said arm, a diaphragm connected to the mushroom head, a fluid confined behind the diaphragm, and a pressure gage connected to the fluid by a relatively narrow channel.

26. The combination of a straight-edge, means for clamping a sheet of fibrous material under the straight-edge, an incline at an angle to the straight-edge, a carriage adapted to travel upon the incline, a lever mounted upon the carriage and having means for gripping the sheet, a spiral screw having a handle for moving the carriage upon the incline and means connected with the lever for indicating the force required to tear the sheet against the edge when the carriage is moved upon the incline.

27. The combination with means defining an edge, of means for holding a sheet of fibrous material along the said edge, means for pulling the said sheet against the edge to tear it, said last named means being adapted to keep the angle of pull on the paper constant.

28. The combination with means defining an edge, of means for holding a sheet of fibrous material along the said edge, an arm positioned adjacent said means and adapted to grip the sheet, and means for moving the arm in the general direction of the edge in substantially constant angular relation thereto.

29. The combination with means defining an edge, of means for holding a sheet of fibrous material along the said edge, means for pulling the sheet against the edge to tear it, said last named means being adapted to keep the angle of pull on the sheet and the rate of tearing substantially constant.

In testimony whereof I affix my signature.

ROBERT ODIORNE WOOD.